US011525373B2

(12) United States Patent
Meyer et al.

(10) Patent No.: US 11,525,373 B2
(45) Date of Patent: Dec. 13, 2022

(54) REMOVABLE SUPPORT INTERFACE FOR AN ANNULAR TURBOMACHINE CASING

(71) Applicant: SAFRAN AIRCRAFT ENGINES, Paris (FR)

(72) Inventors: Julien Alain Meyer, Moissy-Cramayel (FR); Bruno Marie-Joseph Anne Padoue Haentjens, Moissy-Cramayel (FR); Luc Bernard Jean Quernet, Moissy-Cramayel (FR); Erwan Pierre Antoine Perse, Moissy-Cramayel (FR); Maxime Julien Thomazo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/274,742

(22) PCT Filed: Sep. 12, 2019

(86) PCT No.: PCT/FR2019/052123
§ 371 (c)(1),
(2) Date: Mar. 9, 2021

(87) PCT Pub. No.: WO2020/053530
PCT Pub. Date: Mar. 19, 2020

(65) Prior Publication Data
US 2022/0099002 A1 Mar. 31, 2022

(30) Foreign Application Priority Data
Sep. 12, 2018 (FR) ........................................ 1858159

(51) Int. Cl.
*F01D 25/28* (2006.01)

(52) U.S. Cl.
CPC ........ *F01D 25/285* (2013.01); *F05D 2230/60* (2013.01)

(58) Field of Classification Search
CPC ........ F01D 25/285; F01D 25/24; F01D 25/28; F05D 2230/60; F05D 2260/02;
(Continued)

(56) References Cited

U.S. PATENT DOCUMENTS 2,825,477 A * 3/1958 Ross ........................ B64F 5/50
29/559
5,435,124 A * 7/1995 Sadil ..................... F01D 25/285
248/220.21

(Continued)

FOREIGN PATENT DOCUMENTS

FR    3018773 A1    9/2015
FR    3041376 A1    3/2017
(Continued)

OTHER PUBLICATIONS

International Search Report and Written Opinion received in corresponding international application No. PCT/FR2019/052123, filed Sep. 12, 2019, 10 pages.

*Primary Examiner* — Woody A Lee, Jr.
*Assistant Examiner* — Eric A Lange
(74) *Attorney, Agent, or Firm* — Christensen O'Connor Johnson Kindness PLLC (57) ABSTRACT

The disclosure provides a removable support interface for an annular turbomachine casing, the removable interface having a coupling part configured for being mounted on the casing, and at least one attachment element for suspending the casing, orifices arranged in the coupling part the interface having means for locking the coupling part to the casing.

12 Claims, 7 Drawing Sheets

(58) Field of Classification Search
CPC ... Y02T 50/60; B64F 5/50; B25B 3/00; B25B 5/00; B25B 5/003; B25B 5/14; B25B 11/00; B23P 19/04
USPC ............ 29/281.1, 889, 889.1, 889.2, 889.21, 29/889.22
See application file for complete search history.

(56) References Cited

U.S. PATENT DOCUMENTS

| | | | |
|---|---|---|---|
| 10,697,327 B2* | 6/2020 | Dubois | ................ F01D 25/285 |
| 2017/0350278 A1* | 12/2017 | Reddy Asani | .......... F01D 25/28 |

FOREIGN PATENT DOCUMENTS

| | | |
|---|---|---|
| FR | 3051833 A1 | 12/2017 |
| WO | 2015/114276 A1 | 8/2015 |
| WO | 2017/203139 A1 | 11/2017 |

* cited by examiner

REMOVABLE SUPPORT INTERFACE FOR AN ANNULAR TURBOMACHINE CASING

TECHNICAL FIELD

The present invention concerns a support interface. More particularly, the invention concerns a support interface for an engine casing, in particular of an aeronautical engine such as a turbomachine, which is adapted to be used during the manufacture or the handling of the engine.

The invention also relates to an annular turbomachine casing configured to receive such a support interface. It also concerns an assembly comprising such an annular casing and such a support interface, as well as a turbomachine comprising such an assembly. Finally, the present invention concerns a method of handling such a casing by means of such a support interface.

PRIOR ART

The prior art includes documents FR-A1-3 041 376, WO-A1-2015/114276, WO-A1-2017/203139, FR-A1-3 051 833 and FR-A1-3 018 773.

When handling the turbomachines, for example during assembly or maintenance procedures, it is often necessary to support them in an elevated position to allow an easier access to their various components.

In the current technology, at least two receiving cavities are provided in the annular casing of the turbomachines. These cavities, which are diametrically opposed, are configured to receive the end of a support arm attached to a frame. To support the engine, a support arm is inserted into each cavity and attached to the casing so as to suspend and hold the annular casing in a desired position. To ensure that the annular casing is held securely in place, it is necessary that each receiving cavity has a sufficient working depth.

In order to achieve this depth, the annular casing is provided with local thickenings, also known as bosses, into which the receiving cavities for the support arms are machined.

These thickenings increases the weight of the engine. However, for obvious efficiency reasons, it is desirable that the weight of the engine be minimised, especially as these extra thicknesses are not intended for use during the flight phases of aircrafts.

In order to solve this problem, support interfaces have been proposed comprising a coupling part with an outer face and an inner face, the outer face of this coupling part having a cavity capable of receiving a support arm, and the inner face of this coupling part being capable of being mounted on an outer face of an annular casing.

For example, the document FR-A1-3 041 376 describes support interfaces which can be removably fixed to an aeronautical engine casing by means of bolts which can be bolted into pins fitted to the engine casing and which are provided with a internal tapping. However, the interventions requiring the handling of turbomachines can be numerous during the life of a turbomachine, so that these support interfaces have to be assembled and disassembled a large number of times, which can lead to significant wear of the threads of the bolts and tapping of the pins and therefore a risk of poor suspension behaviour of the engine by the support arms. In this way, even if these removable support interfaces meet the weight constraint induced by the permanent support of the bosses on the annular casing, the means for fixing these support interfaces to the annular casing do not allow the turbomachine to be held securely in suspension over the long term.

The present invention offers a simple and effective solution for holding the annular casings of turbomachines in suspension.

SUMMARY OF THE INVENTION

To this end, the invention concerns a removable support interface for an annular turbomachine casing, comprising a coupling part which can be mounted on the annular casing, and at least one attachment element for suspending the annular casing, orifices provided in the coupling part, this interface being characterised in that it further comprises means for locking the coupling part to the annular casing, these locking means being positioned on the coupling part and each comprising a clamp having two jaws, each clamp being movable from an open position in which a pin supported by the casing can be engaged and disengaged from one of said orifices and a closed position in which the pin is immobilized in this orifice.

The support interface with its locking means according to the invention constitutes a captive system with the interesting advantage of being simple and quick to use.

Preferably and advantageously, the jaws of the clamps define an orifice in the closed position having a funnel shape.

Thus, the jaws partly follow the shape of an outer face of the first pins of the annular casing, thus ensuring a good fixing of the support interface.

According to one embodiment, the two jaws of the clamp are hinged about a pivot connection.

According to one embodiment, the pivot connection of the jaws of the clamp is formed by a screw for fixing the jaws to the coupling part.

According to one advantageous embodiment, the jaws of this clamp have, at their free ends, holes for receiving a screw which locks the clamp in a closed position.

According to one embodiment, the two jaws of the clamp extend longitudinally along respective axis parallel to each other, and in which the clamp is configured in such a way that at least one of the jaws can be translated perpendiculary to the axis of the jaws from the open position to the closed position and vice versa.

According to one embodiment, the translation of at least one jaw is obtained by rotation of at least one clamping screw passing through both jaws along the axis of the translation.

The present invention also relates to an annular casing of an aircraft turbomachine, comprising an inner face and an outer face, characterised in that it comprises:
  first pins projecting from the outer face;
  these first pins comprising a thinned portion and a free end connected to the thinned portion by a frustoconical surface and being able to cooperate with orifices of the support interface according to the invention.
  Advantageously, the annular casing further comprises:
  second pins projecting from the outer face;
  these second pins being substantially cylindrical and being capale of cooperating with orifices of the support interface according to the invention.

The annular casing according to the invention has the interesting advantage of being equipped only with shrink-fitted pins capable of cooperating in a simple and effective manner with the support interface guaranteeing fast and easy handling of said annular casing.

The present invention further relates to an assembly comprising at least one annular casing and a support interface having at least one of the above-mentioned characteristics, in which the first pins of the annular casing are configured to pass through orifices of the coupling part of the support interface, the jaws of the clamp being configured to close on the first pins so as to clamp the coupling part to the annular casing.

Thus, the support interface according to the invention is effectively plated on the annular casing, thus preventing a lever arm effect which would amplify the load pick-ups at the pins of the casing.

Advantageously, the second pins of the annular casing are configured to engage in orifices of the coupling part to enable the support interface to be centred on the annular casing.

This ensures that the support interface is properly positioned on the annular casing before being plated and locked onto the annular casing. The invention also relates to a turbomachine characterised in that it comprises an assembly comprising one of the above-mentioned characteristics.

Thus, it is easy to assemble and disassemble the various portions of the annular casings constituting the turbomachine, thus facilitating assembly and maintenance operations.

The invention also relates to a method of handling an annular casing of a turbomachine, comprising the steps of:
  appliying of at least one support interface to the annular casing so that the first pins of the annular casing pass through orifices of the coupling part of the support interface;
  closing the jaws of the clamp on the first pins so as to clamp the coupling part of the support interface to the annular casing.

As previously mentioned, it is easy and quick to fix support interfaces according to the invention on an annular casing to ensure a safe suspension for any type of intervention on the turbomachine.

DESCRIPTION OF THE FIGURES

The present invention will be better understood and other details, characteristics and advantages of the present invention will appear more clearly on reading the description of an example, which is not exhaustive, which follows, with reference to the annexed drawings on which.

the FIG. 6 is an axial section view of the FIG. 5.

DETAILED DESCRIPTION

In this presentation, the terms "internal" and "external" are used to refer to a positioning relative to the axis of rotation of an axial turbomachine.

Figure 1:
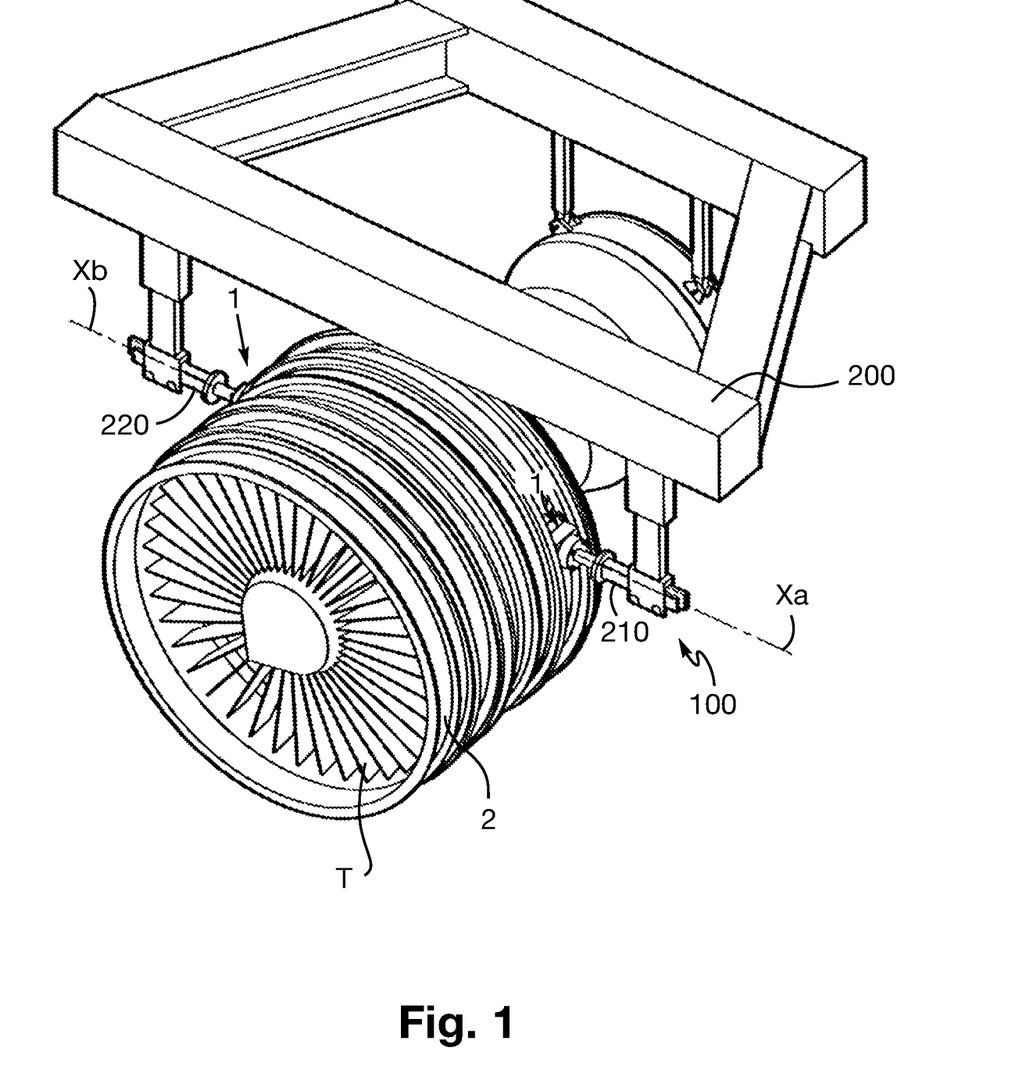
FIG. 1 is an overview of an engine of a turbomachine, supported by a support device via support interfaces according to the invention.

The FIG. 1 shows a support device 100 in cooperation with an annular casing 2 of a fan of a turbomachine T, such as, for example, an intermediate annular casing. The support device 100 comprises a frame 200, two support arms 210, 220 connected to the frame 200 and extending along respective horizontal longitudinal axis Xa, Xb. In the position mounted on the support device 100, and as described in more detail below, the annular casing 2 is therefore supported by the support arms 210, 220 via the two support interfaces 1.

Displacement means (not shown) allow each support arm 210, 220 to be moved, in particular along its longitudinal axis Xa, Xb.

As shown in the FIG. 1, the support arms 210, 220 are positioned substantially opposite each other and in such a way that there is sufficient space between them to accommodate the annular casing 2.

Figure 2:
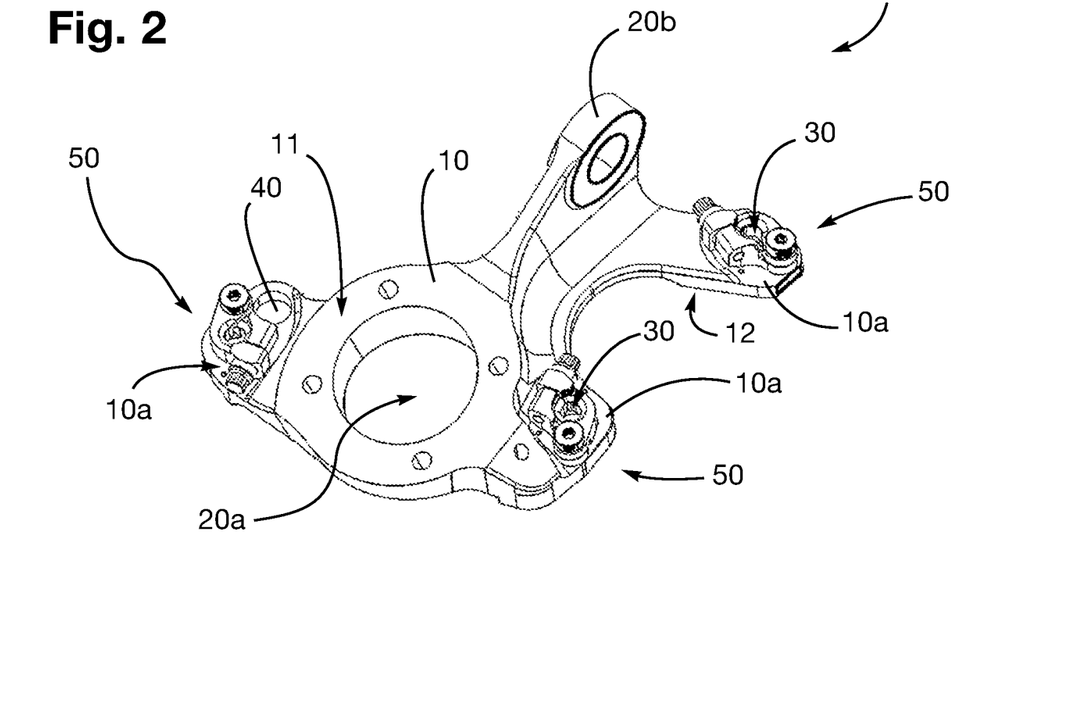
FIG. 2 is a perspective view of the support interface according to the invention.
Figure 3:
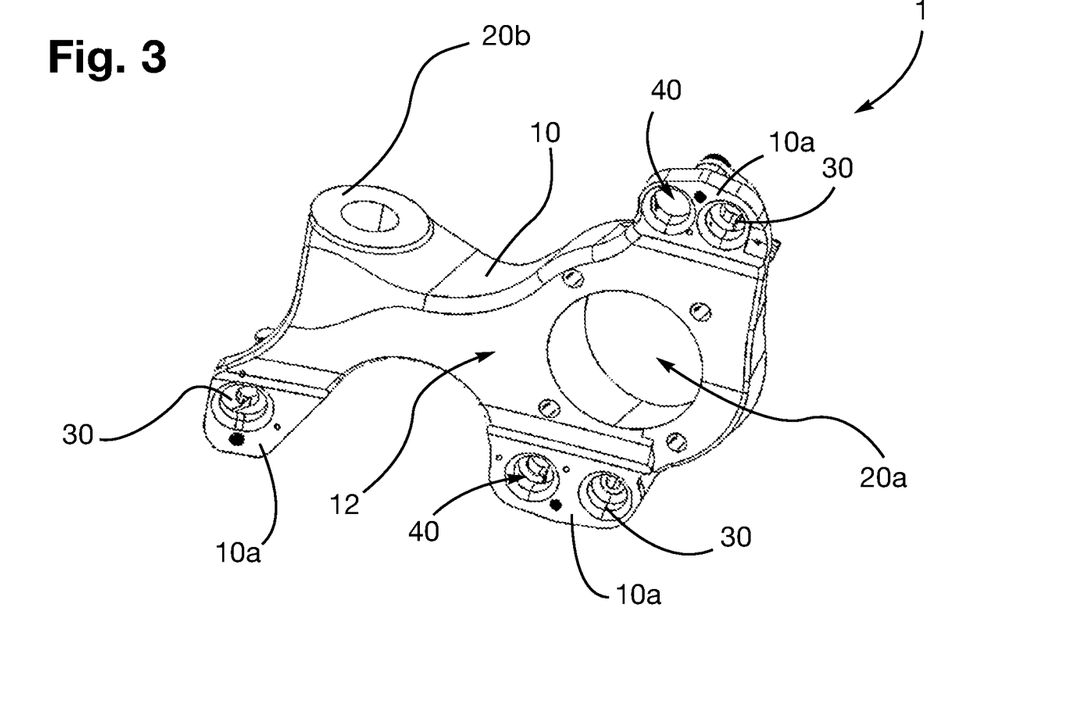
FIG. 3 is a perspective view showing in particular the underside of the support interface according to the invention.

The support interface 1 is shown in detail in the FIGS. 2 and 3. According to an example of the embodiment of the invention, this support interface 1 is configured to be mounted, in a removable manner, on an annular casing 2 of a turbomachine T, e.g. made of titanium. Such a support interface 1 can however be applied in a similar manner to any other type of device comprising a casing and requiring to be held and supported in a desired position. Advantageously, two support interfaces 1 are intended to be arranged and fixed on an outer face 21 of the annular casing 2, angularly at 3 o'clock and 9 o'clock with reference to a time dial, i.e. in a diametrically opposed manner. Each support interface 1 is intended to connect the annular casing 2 to a support and handling device 100 as shown in the FIG. 1. The ends of the arms 210, 220 of the support device 100 are configured to cooperate with the support interfaces 1 according to the invention to hold the casing 2 in the desired position.

In the example shown in the FIGS. 2 and 3, the support interface 1 comprises a coupling part 10 and at least one attachment element 20a, 20b of this coupling part 10 to the annular casing 2.

The coupling part 10 comprises an outer face 11, an inner face 12. This inner face 12 is configured to be positioned opposite to the outer face 21 of the annular casing 2, when the support interface 1 is mounted on the annular casing 2. Advantageously, the inner face 12 of the coupling part 10 has a bending radius similar to that of the outer face 21 of the annular casing 2 to allow correct positioning, without clearance, of the support interface 1 on the annular casing 2. First orifices 30 and second orifices 40 are provided in coupling part 10. The first orifices 30 are crossing from the outer face 11 to the inner face 12 of the coupling part 10. The second orifices 40 are either crossing from the outer face 11 to the inner face 12 of the coupling part 10 or are blind, i.e. they are provided in the inner face 12 of the coupling part 10 and do not lead to the outer face 11 of the coupling part 10.

In particular, the first orifices 30 and the second orifices 40 are located in enlarged portions 10*a* of the coupling part 10.

The attachment elements for handling the annular casing 2 have orifices 20*a* located in the coupling part 10. The ends of the support arms 210, 220 of the support device 100 then comprise a distal portion with a constant cylindrical cross-section, here with a circular profile, suitable for engaging in the orifices 20*a*.

The coupling part 10 also comprises a second attachment element 20*b* for the suspension of the annular casing 2 projecting from the outer face 11 of the coupling part 10. This pointed attachment element 20*b* is used to suspend the annular casing 2 via a handling hook of the support device 100, particularly to lift the annular casing 2, for example for docking it on an aircraft.

Figure 8:
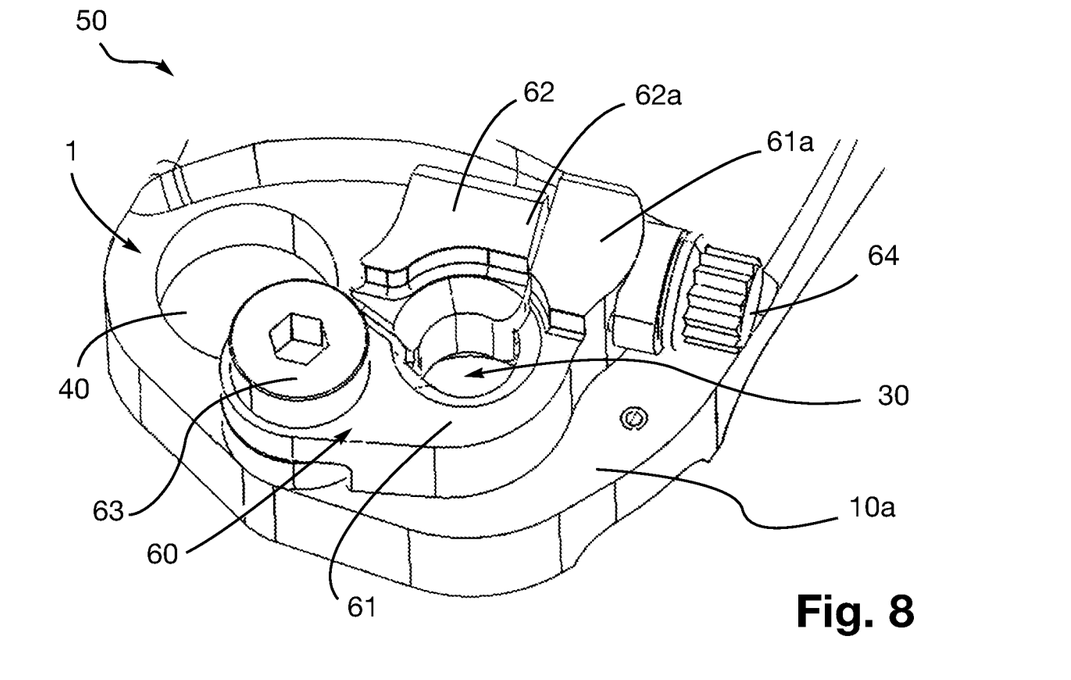
FIG. 8 is a detailed perspective view of the support interface showing the clamp.

The support interface 1 also comprises, on the outer face of the coupling part 10, means 50 for locking the coupling part 10 to the annular casing 2. One of these locking means 50 is shown in greater detail in the FIG. 8. The locking means 50 comprises a clamp 60 with two jaws 61, 62 hinged around a pivot connection, e.g. formed by a screw 63 for fastening the jaws 61, 62 to the coupling part 10. The heads of the screws 63 are accessible with traditional tools such as keys.

The first orifices 30 and the second orifices 40 are configured to co-operate, respectively, with first pins 70 and second pins 80, projecting from the outer face 21 of the annular casing 2.

Advantageously, the first pins 70 and the second pins 80 are arranged on the annular casing 2 to form two annular rows. The first pins 70 and the second pins 80 are arranged separately on these annular rows so as to form several groups, the number of groups corresponding to the number of clamps 60 of the support interface 1, each group comprising at least a first frustoconical pin 70 allowing the attachment of a clamp 60 and at least one of these groups comprising a second simple cylindrical pin 80. The groups comprising a second cylindrical pin 80 are configured to be distributed over the different annular rows.

Figure 4:
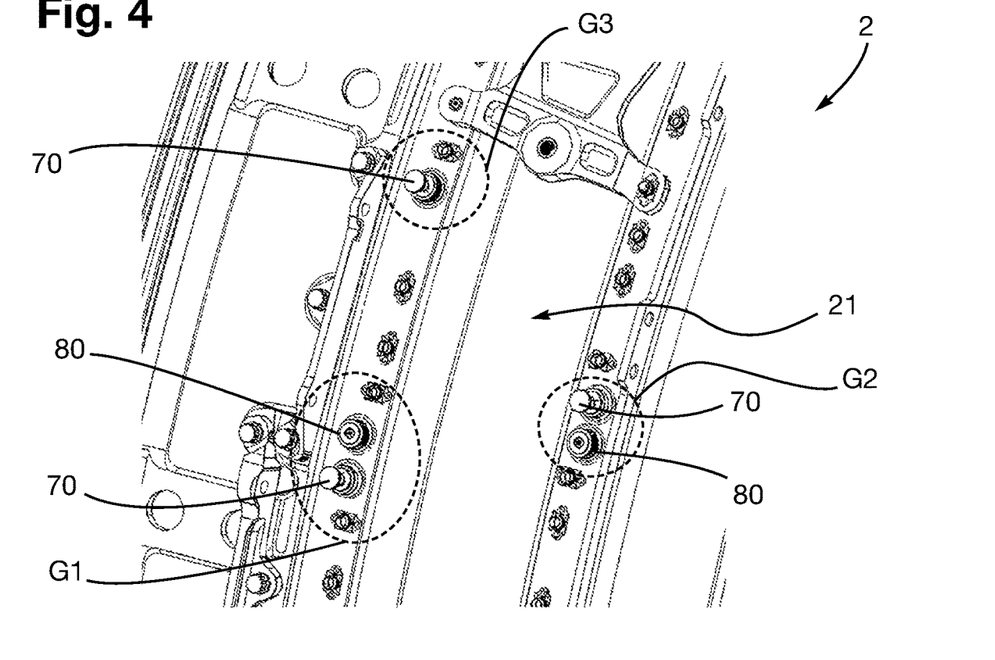
FIG. 4 is a detailed perspective view of the annular casing according to the invention.

According to the example embodiment shown in the FIG. 4, the annular casing advantageously comprises, in a portion intended to receive a support interface 1 according to the invention, three first pins 70 and two second pins 80, the second pins 80 being positioned close to two of the three first pins 70. In other words, the first pins 70 and the second pins 80 are organised in three groups G1, G2, G3, two G1, G2 of these groups comprising a first pin 70 and a second pin 80 (FIG. 5) and the third group G3 comprising only a first pin 70.

Indeed, the environment of the annular casing 2 is very constrained so that it can be difficult to integrate a third second pin 80. In addition, the use of two second cylindrical pins 80 for three groups of pins is sufficient to ensure the mechanical strength of the support interface 1. It should also be noted that the addition of a third second pin 80 would make the assembly hyperstatic, thus constraining the assembly, as such a hyperstatic assembly would indeed require large clearances to allow the mounting of the support interface 1 on the annular casing 2, thus negating one of the interests of the secondary pins 80, i.e. the shear force recovery aid (described below).

In the example of embodiment shown, two secondary pins 80 are used. However, it is conceivable to have only one second pin 80 in all the pin groups, for example for an annular casing 2 of a low-powered aircraft turbomachine with smaller dimensions and lower weight.

Figure 5:
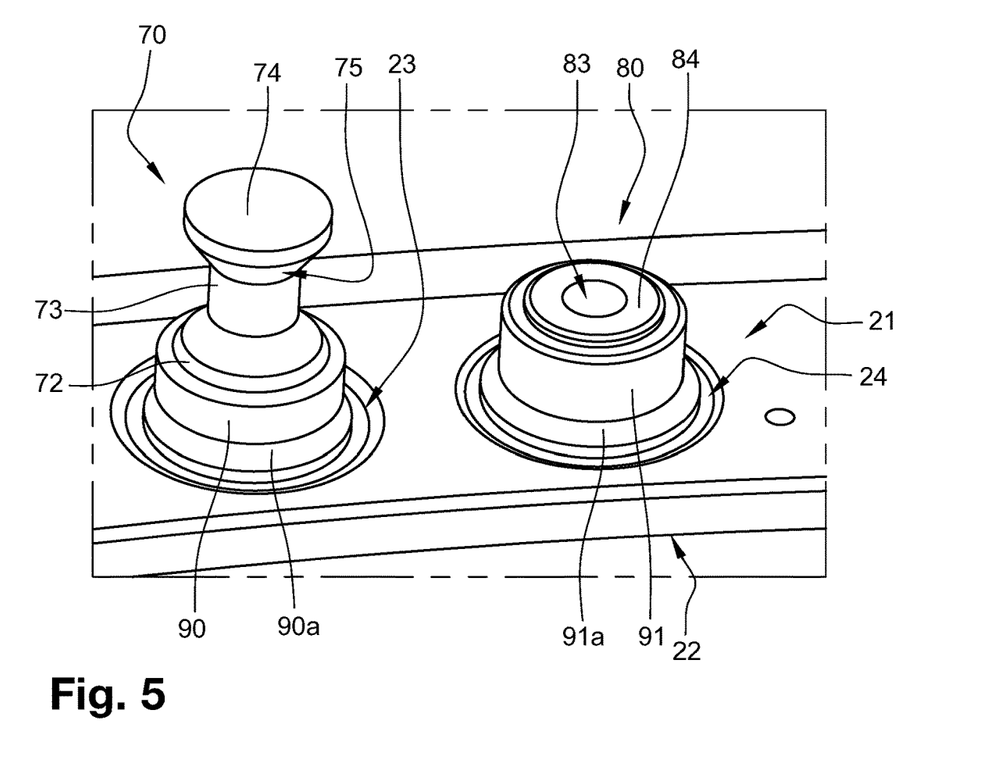
FIG. 5 is a detailed perspective view showing a first pin and a second pin equipping the annular casing according to the invention.
Figure 6:
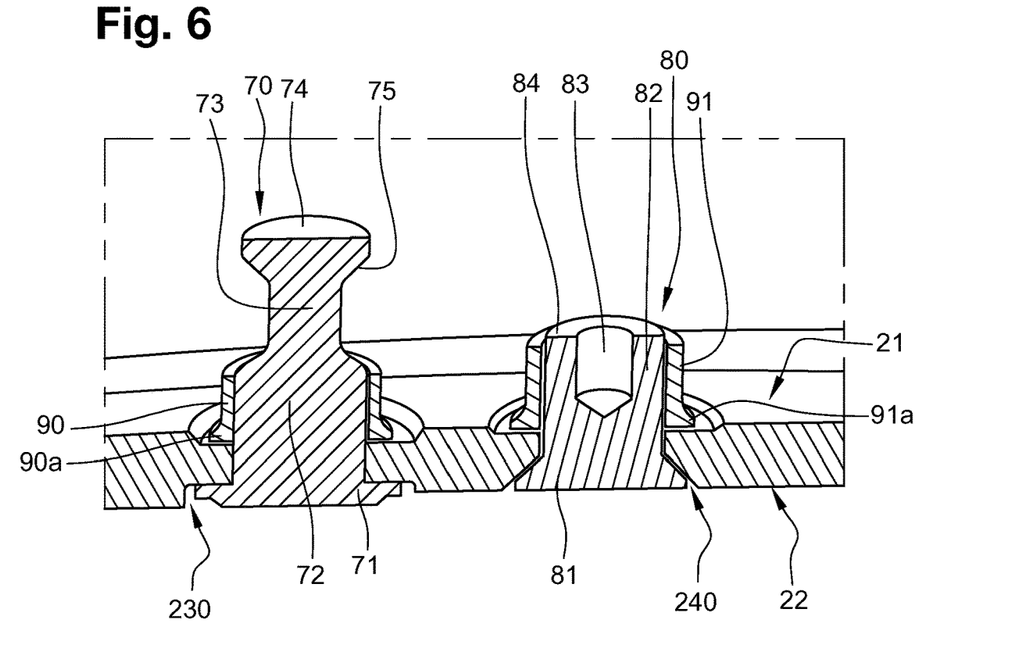

With reference to the FIGS. 5 and 6, the first pins 70 and the second pins 80 are inserted from an inner face 22 of the annular casing 2 into orifices 23, 24 respectively located in the annular casing 2, and are shrunk into the annular casing 2. The first pins 70 comprise a base 71, a cylindrical body 72 having a thinned portion 73 and a free end 74 connected to the thinned portion 73 by a frustoconical surface 75. The base 71 of the first pins 70 forms a widened end with respect to their cylindrical body 72. The base 71 is suitable for engagement in a counterbore 230 provided on the inner face of the annular casing 2 at the entrance of the orifices 23 for receiving the first pins 70.

The second pins 80 comprise a base 81 and a cylindrical body 82 with an axial bore 83 and a free end 84. The axial bore 83 is not tapped and allows a tool to be fixed to shrink-fit the second pins 80 into the annular casing 2. The base 81 of the second pins 80 forms a widened end with respect to their cylindrical body 82. This base 81 is suitable for engagement in a housing 240 provided on the inner face of the annular casing 2 at the entrance of the orifices 24 for receiving the second pins 80. Advantageously, the base 81 of the second pins 80 has a frustoconical shape and the housings 240 receiving these bases 81 have a complementary frustoconical surface shape. The complementary frustoconical shapes of the base 81 of the second pins 80 and of the housings 240 for receiving these bases 81 make it possible to locally increase the contact surface between the second pins 80 and the annular casing 2, despite a small skin thickness of the shell of the annular casing 2. Thus, the base 81 of the second pins 80 is conically supported against the annular casing 2, thus increasing the shear support area and allowing the second pins 80 to assist in the recovery of shear forces induced when the engine is suspended via the support interfaces 1, as it will be explained in more detail below.

The first pins 70 and the second pins 80 are subject to high mechanical stresses, including load stresses of the range of 9G, when handling or transporting the annular casing 2. Indeed, for obvious reasons, the annular casing 2 must not be able to detach itself from a support device 100 (detailed below) when handling or transporting it. In order to reinforce them and thus prevent them from being torn off during use, they each have a retaining ring, respectively 90, 91, allowing their respective thickness to be increased locally and thus their robustness. These rings 90, 91 have an annular skirt 90*a*, 91*a* with a diameter greater than a diameter of said rings 90, 91, one underside of these annular skirts 90*a*, 91*a* being positioned on the outer face 21 of the annular casing 2.

The second pins 80 are configured to be inserted into the second orifices 40 of the coupling part 10 of the support interfaces 1 by their free end 84. Their cylindrical body 82 ensures that coupling part 10 of the support interface 1 is centred and correctly positioned on the annular casing 2.

The first pins 70 are configured to be inserted into the first orifices 30 of the coupling part 10 of the support interfaces 1 by their free end 74. Their thinned portion 73 and their frustoconical surface 75 are configured to co-operate with the locking means 50 to ensure the plating and the temporary fixing of the support interface 1 to the annular casing 2, as it will be explained in more detail below.

The clamps 60 are movable between an open position and a closed position.

Figure 9:
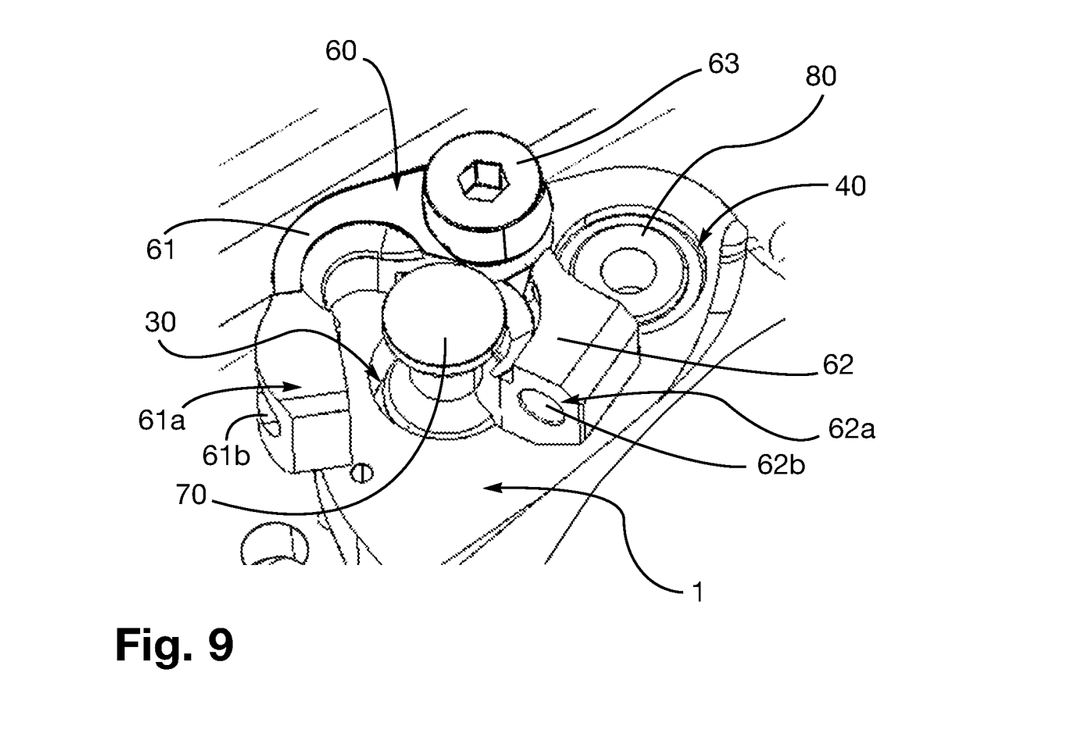
FIG. 9 is a detail and perspective view showing the support interface positioned on the annular casing and in which the clamp is shown in the open position.

With reference to the FIG. 9, in the open position of the clamp 60, the jaws 61, 62 are spaced apart and allow the engagement and the disengagement of a first pin 70 supported by the annular casing 2 from a first orifice 30 of the coupling part 10 of the support interface 1. Similarly, a second pin 80 supported by the annular casing 2 can be engaged and disengaged from a second orifice 40 of the coupling part 10 of the support interface 1.

Figure 10:
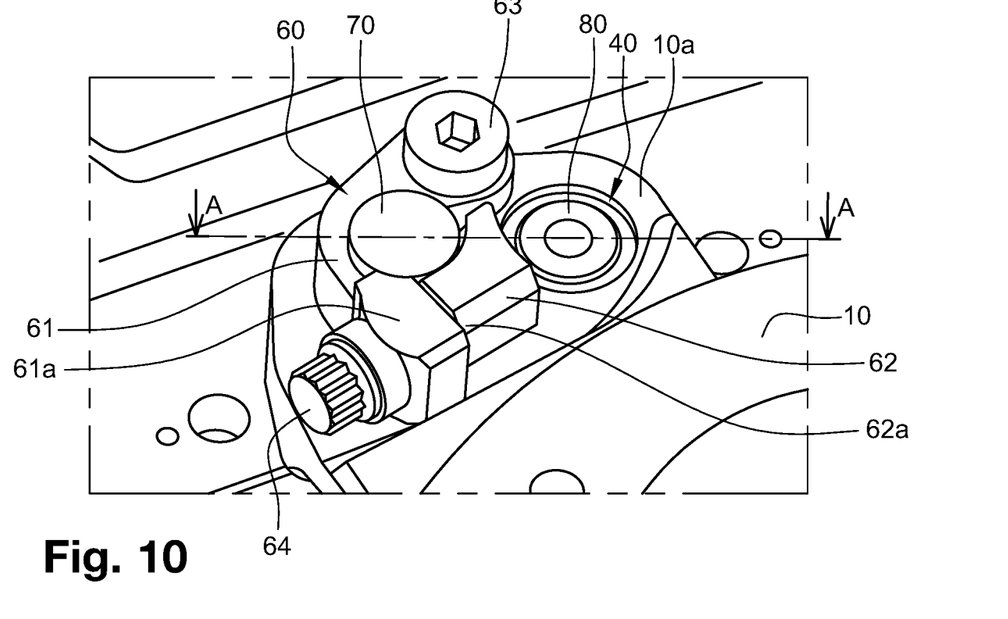
FIG. 10 is a view similar to the FIG. 9 in which the clamp is shown in the closed position.
Figure 11:
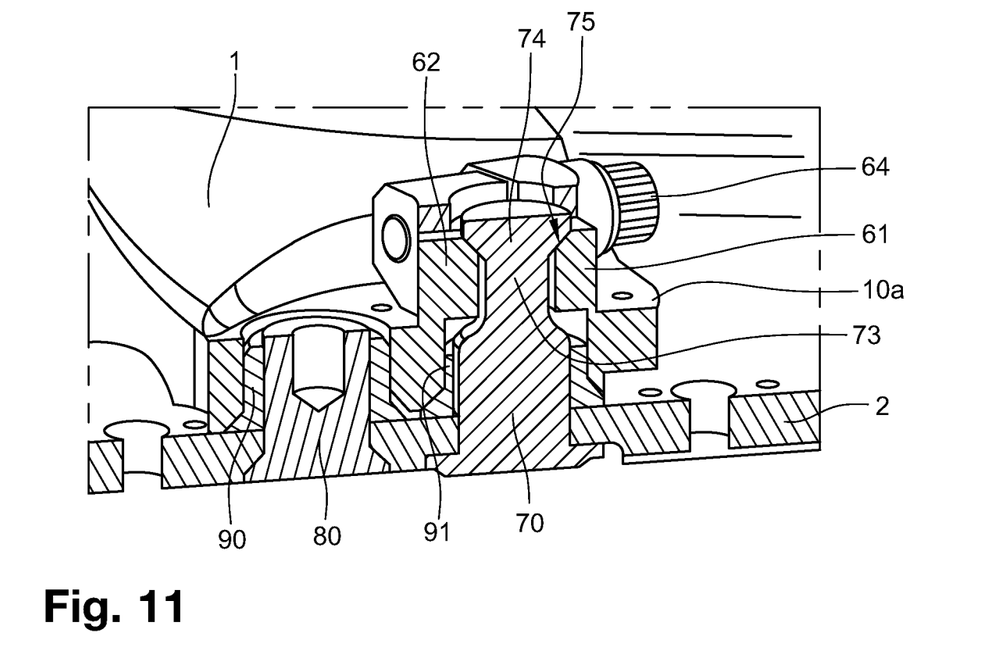
FIG. 11 is a sectional view along the axis A-A of the FIG. 10.

With reference to the FIGS. 10 and 11, in the closed position of the clamp 60, the jaws 61, 62 are close together so as to surround and grip a first pin 70 at its thinned portion 73. In fact, the jaws 61, 62 of the clamp 60 define, in the closed position, a funnel-shaped hole, i.e. a portion of circular section surmounted by a frustoconical portion, in order to be able to match an outer face defined by the thinned portion 73 and the frustoconical surface 75 of the first pins 70. In other words, the circular cross-section portion of the funnel shape is positioned opposite the thinned portion 73 of the first pin 70 and the frustoconical portion of the funnel hole is positioned opposite the frustoconical surface 75 of the first pin 70. The clamp 60 is then locked. For this purpose, the jaws 61, 62 of each clamp 60 have, at their free ends 61a, 62a (i.e. their ends opposite to those carrying the screw 63 ensuring the pivotal connection of the jaws 61, 62), holes 61b, 62b for receiving a screw 64 ensuring the locking of the clamp 60 in the closed position. Preferably and advantageously, the screw 64 for locking the clamp 60 is a tilting screw which prevents it from bending when it is clamped. Moreover, the heads of the screws 64 are accessible with traditional tools such as keys.

Figure 7:
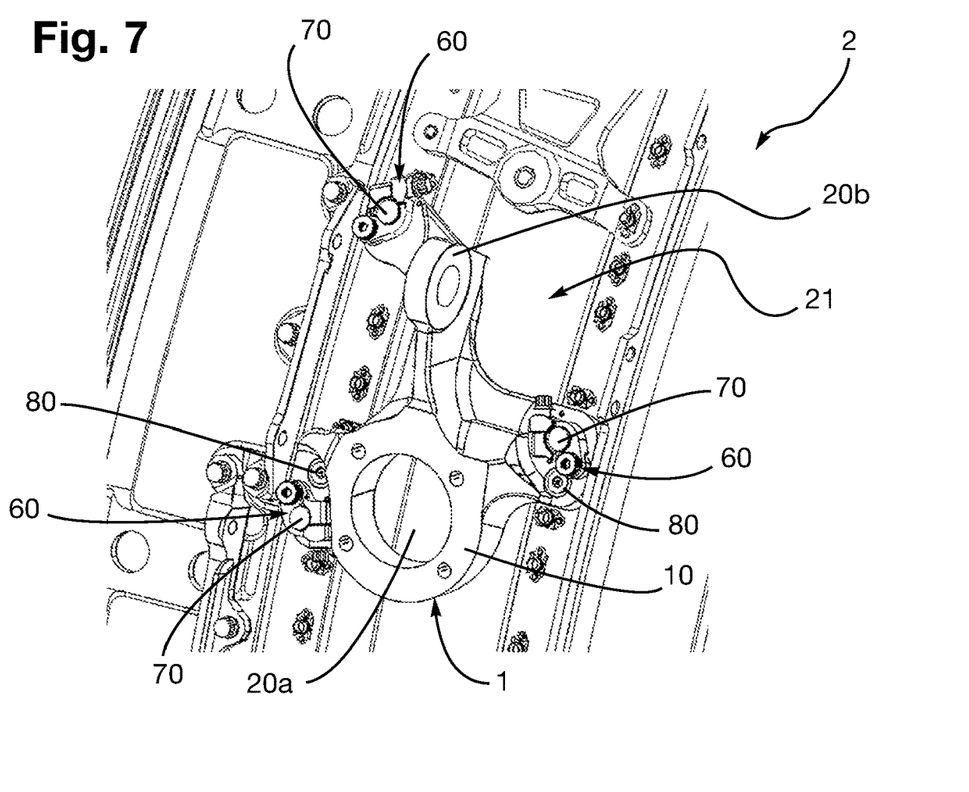
FIG. 7 is a view similar to the FIG. 4 in which a support interface is positioned on the annular casing.

In the closed and locked position of the clamps 60, the first pins 70 are immobilized by the jaws 61, 62 in the first orifices 30 and the coupling part 10 is plated against the outer face 21 of the annular casing 2, as shown in FIG. 7. And, as a result, the second pins 80 are also immobilized in the second orifices 40.

The locking means 50 and in particular the clamps 60 thus ensure that the support interface 1 is plated and fixed in position on the annular casing 2 by means of a double system, i.e. a cone clamping system (conical support at the frustoconical surface 75) and a screw clamping system (with the screw 64 for locking the jaws 61, 62), which increases the robustness of the fixing of the support interface 1 on the annular casing 2.

When handling an annular casing 2, e.g. for the assembly of a turbomachine T or for a maintenance procedure on this turbomachine T, at least one support interface 1, preferably two support interfaces 1 are brought close to the annular casing. The internal faces 12 of the support interfaces 1 are positioned opposite the outer face 21 of the annular casing 2. The first orifices 30 of the coupling part 10 of each support interface 1 are positioned in line with the first pins 70 of the annular casing 2 and the second orifices 40 of the coupling part 10 of each support interface 1 are positioned in line with the second pins 80 of the annular casing 2. The clamps 60 are then presented in the open position.

The support interfaces 1 are then applied to the annular casing 2 in a diametrically opposed manner so that the first pins 70 of the annular casing 2 pass through the first orifices 30 of the coupling part 10 of each support interface 1 and the second pins 80 of the annular casing 2 are engaged in the second orifices 40 of the coupling part 10 (and pass through these second orifices 40 in the case of through orifices, therefore not blind) of each support interface 1.

The clamps 60, fixed to the support interface 1 by the screw 63, are then closed on the first pins 70 by rotation of the jaws 61, 62 around their pivot connection constituted by the screw 63 so as to clamp the coupling part 10 of each support interface 1 on the annular casing 2.

Finally, the locking screw 64 is screwed into the holes 61b, 62b provided in the ends 61a and 62a of the jaws 61, 62 in order to lock the clamp 60 in the closed position and to immobilise the coupling part 10 of each support interface 1 on the annular casing 2.

A support device 100 can then be moved closer to the annular casing 2. The support arms 210, 220 are positioned approximately opposite the support interfaces 1 attached to the annular casing 2. The ends of the arms 210, 220 of the support device 100 are inserted and fixed to the attachment elements 20a of the support interfaces 1. The attachment elements 20a of the support interfaces 1 are, for example, provided with threads for screwing on the ends of the arms 210, 220, which are also provided with threads.

The annular casing 2 is then connected to the support device 100 and can be held securely in a desired position and moved by action on known means of movement allowing the movement of the support arms 210, 220 of the support device 100. Hooks of the support device 100 can also be passed through the projecting orifices of the second attachment elements 20b of the support interfaces 1 for the suspension of the annular casing 2.

When the handling of the annular casing 2 is complete, the ends of the arms 210, 220 of the support device 100 are removed from the attachment elements 20a, the hooks of the support device 100 are removed from the second attachment elements 20b if necessary, the locking screws 64 are removed to release the jaws 61, 62, the clamps 60 are opened and the support interfaces 1 are removed from the annular casing 2.

It should be noted that the support interfaces 1 to be positioned on either side of the annular casing 2 for suspension of the annular casing 2 can be identical in all respects. Advantageously, the support interfaces 1 can be arranged symmetrically so that they each can be adapted to different geometrical requirements, which can be different depending on the side of the annular casing 2 they have to equip. The support interfaces 1 are made of any material with the robustness required for their function. For example, they are made of steel.

The annular casing 2 with first pins 70 and second pins 80 and the support interfaces 1 configured to cooperate with the first and second pins 70, 80 of the annular casing 2 thus form a robust unit for simple and safe handling of a annular casing 2. A turbomachine T comprising such an annular casing 2 according to the invention can thus be assembled and disassembled several times throughout its service life without risk. Indeed, the locking by clamp 60 of the support interface 1 according to the invention does not induce wear at the level of the pins 70, 80 of the annular casing 2 as is the case with the tapped pins of the prior art.

Figure 12:
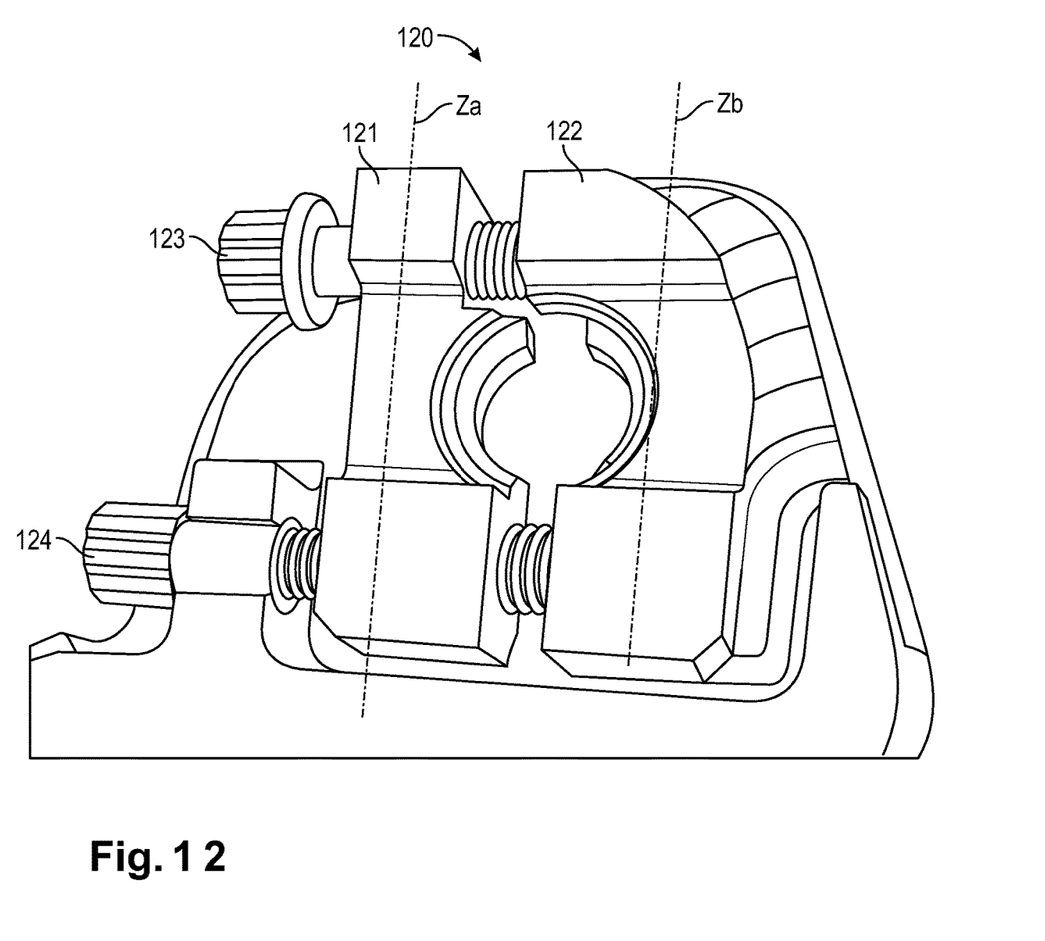
FIG. 12 is a detailed perspective view of an embodiment of a clamp of a support interface according to the invention.

In an alternative embodiment of the support interface, described with reference to the FIG. 12, the jaws of the clamps are no longer hinged around a pivot connection but are arranged parallel to each other and can slide from the open position to the closed position and vice versa. Specifically, the two jaws 121 and 122 of the clamps 120 extend longitudinally along axis Za and Zb which are parallel to each other and at least one of the jaws can be moved perpendicularly to these axis in order to move the clamp from the open position to the closed position or vice versa. In the example shown, the translation is achieved by rotating the clamping screws 123 and 124. In general, such a translation can be obtained by rotating at least one clamping screw which passes through both jaws along the axis of the desired translation. The person skilled in the art will appreciate that, in this case, the two jaws have tapped holes complementary to the thread of the clamping screw(s).

A particular advantage of the present invention is that all the elements which may be subject to wear in use such as the threads are on the support interface 1 and no longer on an element of the annular casing 2. In this way and contrary to the devices of the prior art where it was necessary to immobilise and intervene on a turbomachine, it is simpler and less expensive to replace a support interface 1 according to the invention if the latter is no longer functional.

The invention claimed is:

1. A removable support interface for an annular casing of a turbomachine, comprising: a coupling part configured to be mounted on the annular casing, at least one attachment element configured for suspending the annular casing, orifices provided in the coupling part, and a clamp for locking the coupling part to the annular casing, wherein the clamp is positioned on the coupling part and comprises two jaws, the clamp being movable from an open position configured to disengage from one of said orifices a pin supported by the annular casing, to a closed position configured to engage and immobilize the pin in the one of said orifices.

2. The removable support interface according to claim 1, wherein the two jaws of the clamp define one of the orifices in the closed position, wherein the orifice defined by the two jaws in the closed position has a funnel shape.

3. The removable support interface according to claim 1, in which the two jaws of the clamp are hinged about a pivot connection.

4. The removable support interface according to claim 3, in which the pivot connection is formed by a screw configured for fixing the two jaws to the coupling part.

5. The removable support interface according to claim 4, in which the two jaws each have, at free ends thereof, a hole configured for receiving a screw which locks the clamp in the closed position.

6. The removable support interface according to claim 1, in which the two jaws extend longitudinally along respective parallel axes and wherein the clamp is configured so that at least one of the two jaws can be translated perpendicularly to the parallel axes from the open position to the closed position and vice versa.

7. The removable support interface according to claim 6, wherein rotation of at least one clamping screw passing through both jaws along an axis of translation is configured to translate the at least one of the two jaws.

8. An annular casing of an aircraft turbomachine, comprising:
an inner face and an outer face; and
first pins projecting from the outer face, wherein the first pins each comprise a thinned portion and a free end connected to the thinned portion by a frustoconical surface, wherein the first pins are each configured to cooperate with a plurality of first orifices of the orifices of the removable support interface according to claim 1.

9. The annular casing according to claim 8, further comprising:
second pins projecting from the outer face,
wherein the second pins are cylindrical and each configured to cooperate with a plurality of second orifices of the orifices of the removable support interface according to claim 1.

10. An assembly comprising the annular casing according to claim 9 and the support interface according to claim 1, wherein the first pins of the annular casing are configured to pass through the plurality of first orifices of the coupling part of the removable support interface, wherein the two jaws of the clamp are configured to close on any of the first pins so as to clamp the coupling part to the annular casing.

11. The assembly according to claim 10, wherein the second pins of the annular casing are configured to engage in the plurality of second orifices of the coupling part, thereby centering the removable support interface on the annular casing.

12. An aircraft turbomachine comprising an assembly according to claim 10.

* * * * *